Figure 1:
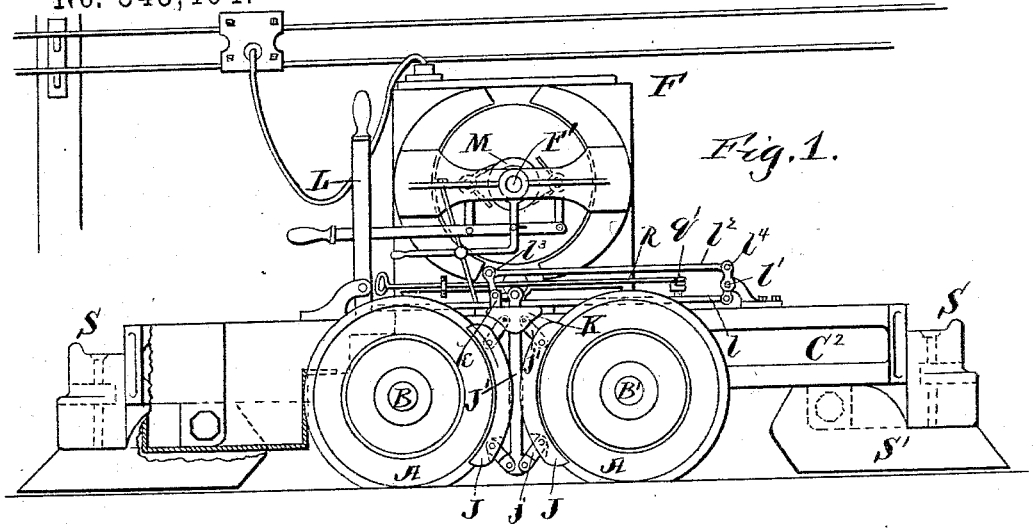

(No Model.) 5 Sheets—Sheet 1.

H. B. DIERDORFF.
ELECTRICALLY OPERATED MINE CAR.

No. 545,404. Patented Aug. 27, 1895.

Witnesses:

Inventor:
Henry B. Dierdorff
by Doubleday & Ellis
attys (No Model.)  H. B. DIERDORFF.
ELECTRICALLY OPERATED MINE CAR.
No. 545,404.  Patented Aug. 27, 1895.
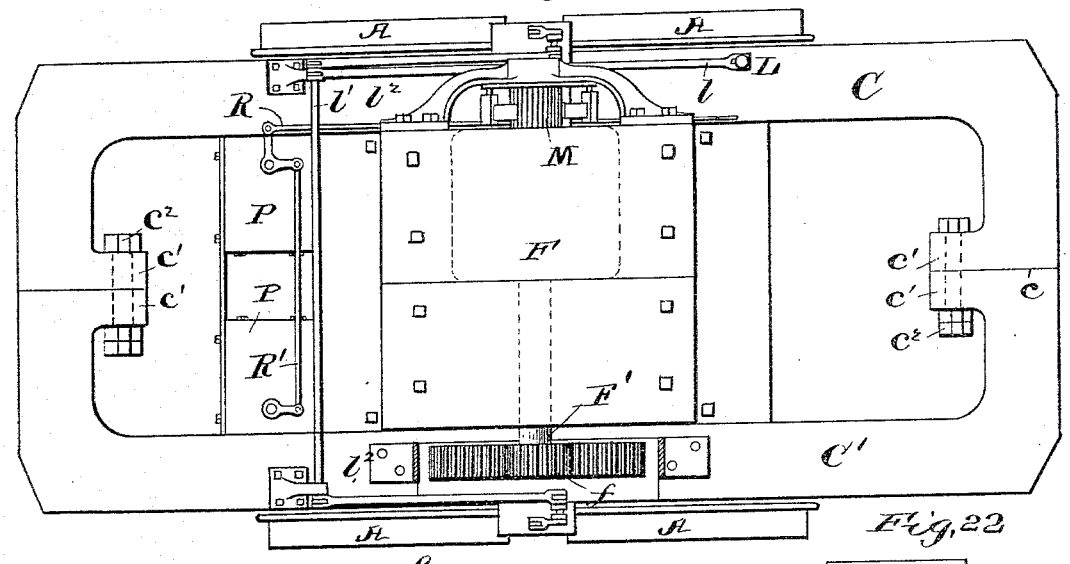
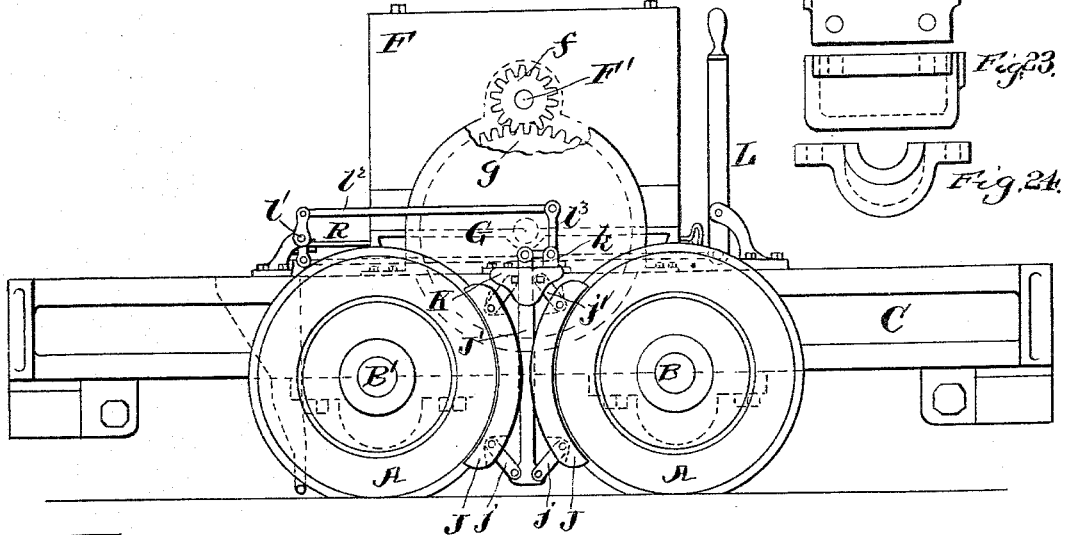
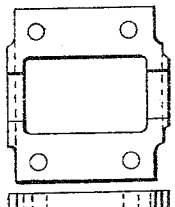
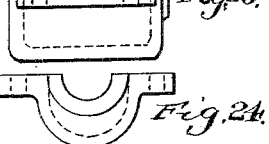

(No Model.) 5 Sheets—Sheet 3.
H. B. DIERDORFF.
ELECTRICALLY OPERATED MINE CAR.
No. 545,404. Patented Aug. 27, 1895.
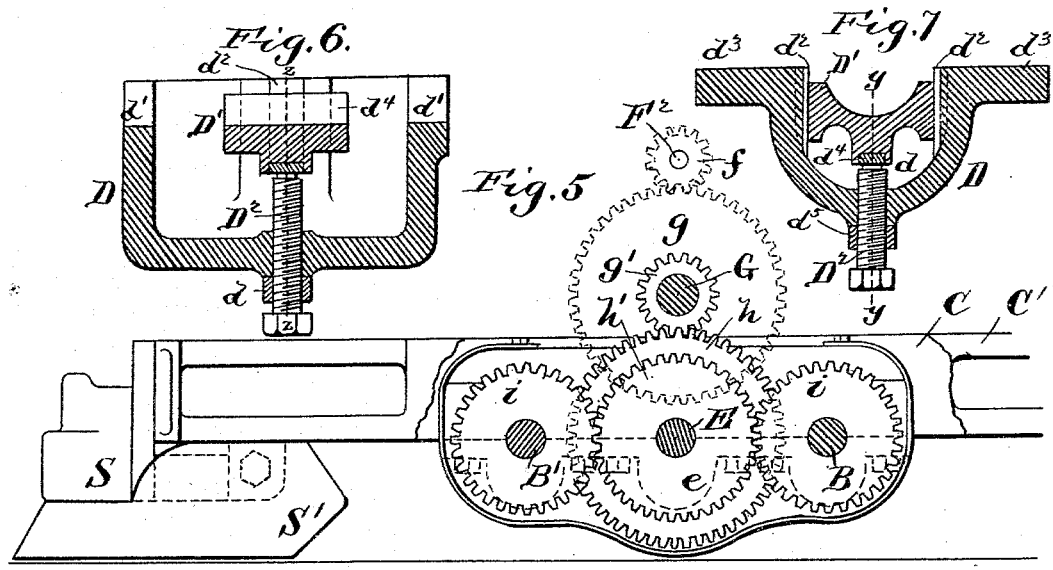
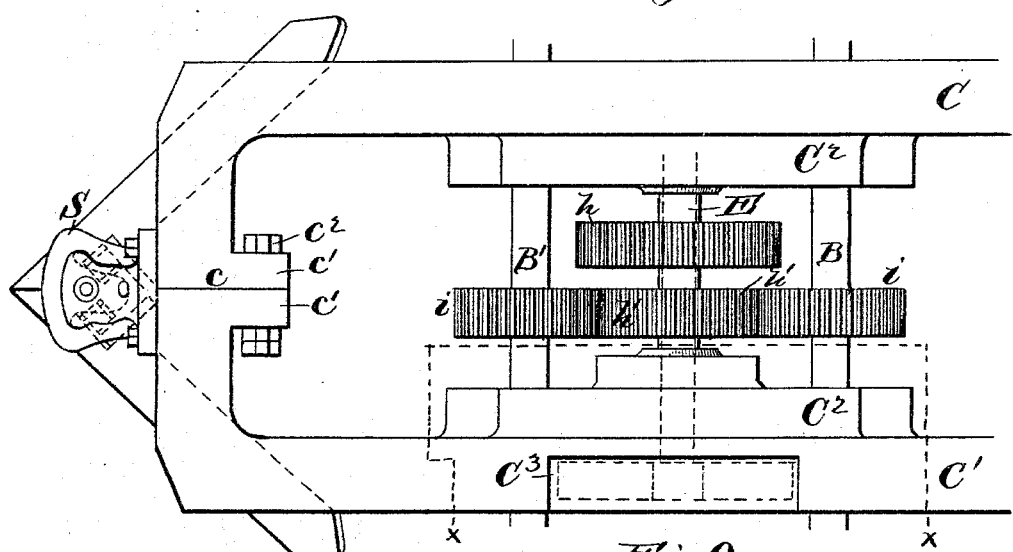
Witnesses
J. B. McGirr
M. B. May
Inventor
Henry B. Dierdorff
by Doubleday & Bliss
attys (No Model.) 5 Sheets—Sheet 4.
H. B. DIERDORFF.
ELECTRICALLY OPERATED MINE CAR.
No. 545,404. Patented Aug. 27, 1895.
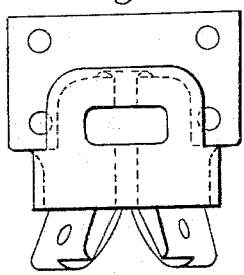
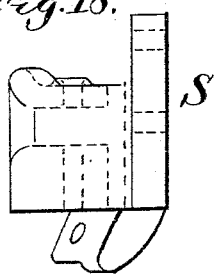
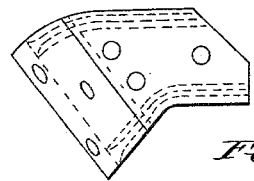
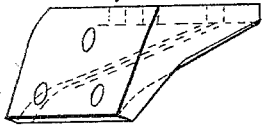
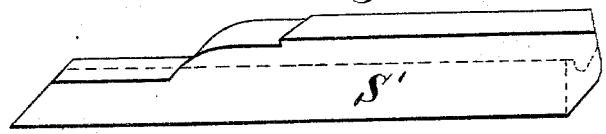
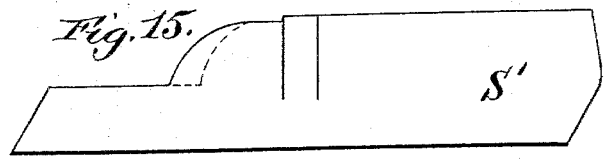
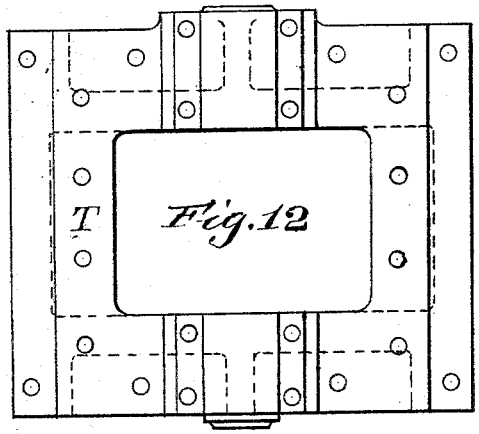
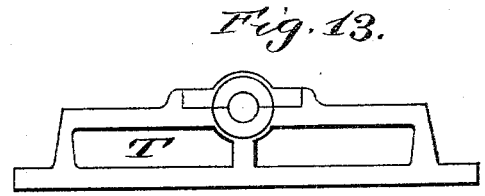
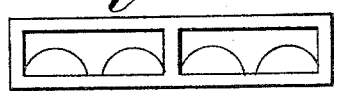
Witnesses:
J. B. McGirr.
Marcus B. May.
Inventor:
Henry B. Dierdorff
By Doubleday & Bliss
attys

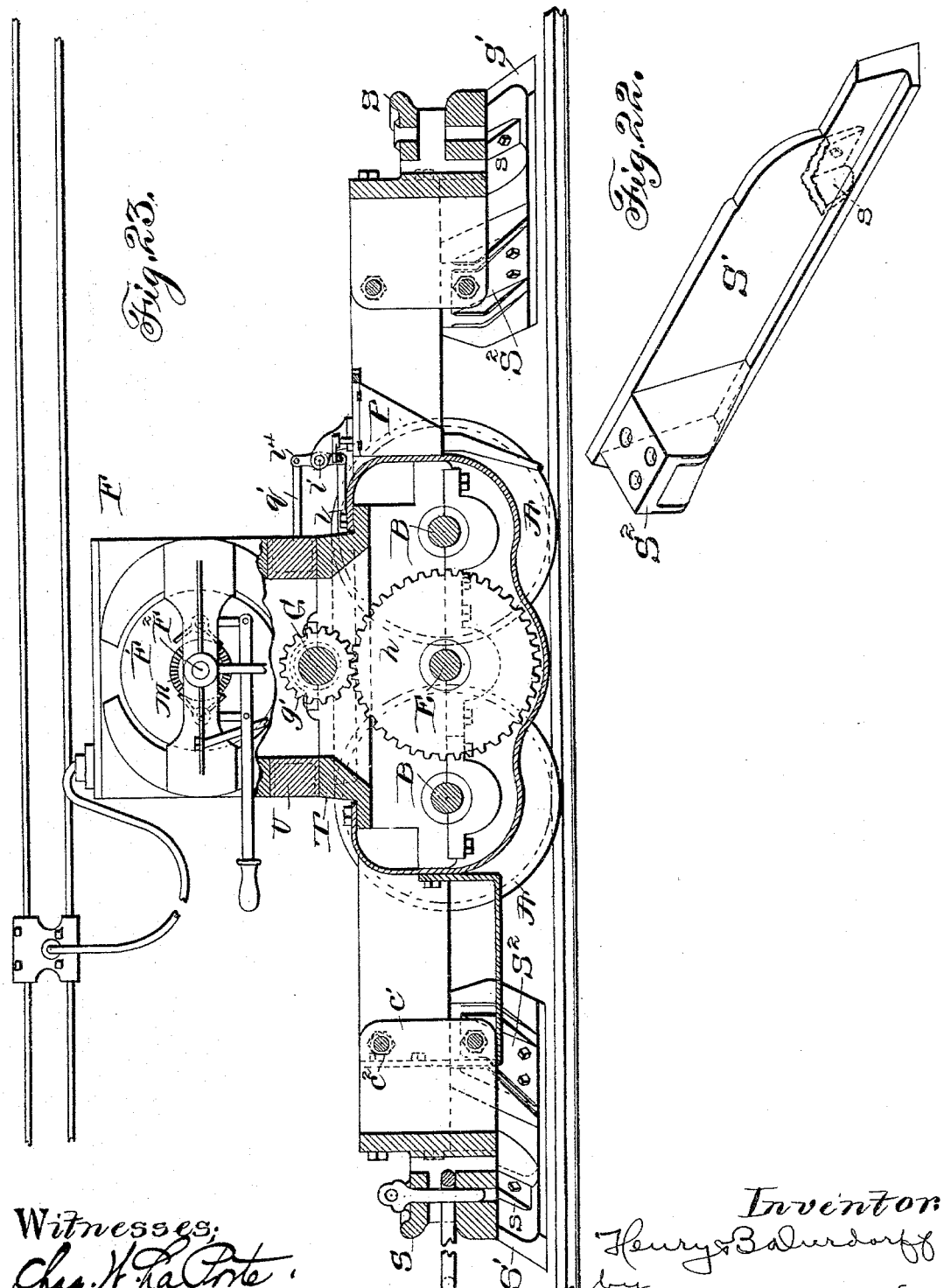

UNITED STATES PATENT OFFICE.

HENRY B. DIERDORFF, OF COLUMBUS, OHIO.

ELECTRICALLY-OPERATED MINE-CAR.

SPECIFICATION forming part of Letters Patent No. 545,404, dated August 27, 1895.

Application filed December 24, 1889. Serial No. 334,906. (No model.)

*To all whom it may concern:*

Be it known that I, HENRY B. DIERDORFF, a citizen of the United States, residing at Columbus, in the county of Franklin and State of Ohio, have invented certain new and useful Improvements in Mine-Cars, of which the following is a specification, reference being had therein to the accompanying drawings.

This invention relates to improvements in cars specially intended for use in coal-mines. It is now well known to those that have had experience in using traction-cars or motor-cars in mines that there are a number of serious difficulties characteristic of the conditions and circumstances at such places and not found in outside car work or transportation. The space or room both vertically and laterally for a motor-car or traction-car is exceedingly limited, in many cases the roofs being only four, five, and six feet from the floor and the side walls being separated only eight or nine feet at the outside, within which latter space must come tracks, switches, and other matters which cramp the room. Again, the grades, relative to the horizontal of the track, vary greatly, they in some cases rising to five and six per cent. In such cases difficulties almost insuperable have been found in providing sufficient traction for transporting a train of coal-cars of sufficient number to make it economical to operate in this manner. Resort has been had to cog-tracks and traction-wheels and various means for increasing the traction of the motor-car (necessarily very much reduced in size, by reason of the aforesaid difficulties) upon the track. Further, there are frequent bends in the entries of relatively sharp curves, so that it is impossible to make the cars more than from seven to nine feet long, or thereabout.

The object of the present invention is to provide a simply-constructed motor-car or traction-car which shall be durable under the severe strains to which they are subjected in mines, and which shall be capable of drawing over all of the ordinary grades and around the curves commonly met with a load of large tonnage.

The invention also relates to so arranging the parts of an electric-motor car that there shall be ample space or room for the driver, and to which space shall be brought the various levers and mechanisms for starting, stopping, retarding, and reversing the movement of the car, including mechanism for shifting the brushes of the commutator and mechanism for interchanging the brushes of two opposing sets.

It also relates to the improvements in the gearing arranged intermediately of the motor and the track-wheels. It relates to other matters, which will be fully set forth hereinbelow.

Figure 10:
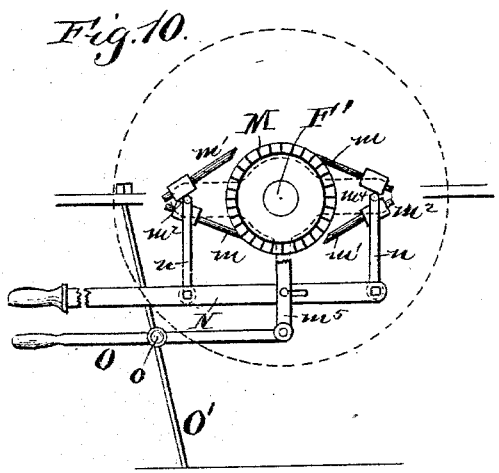
Figure 11:
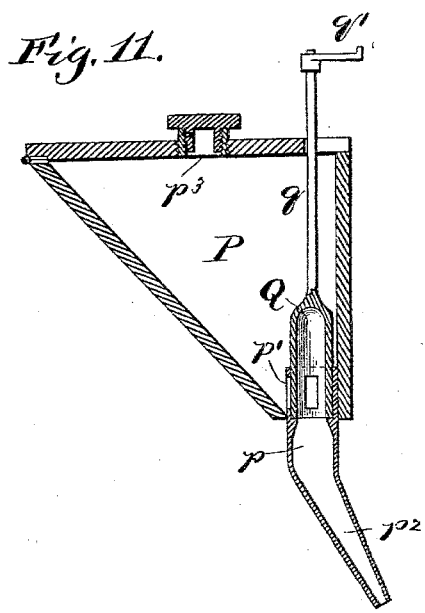

Figure 1 is a side view of my improved mine-car. Fig. 2 is a view from the other side. Fig. 3 is a plan view, some of the parts being detached. Fig. 4 is a plan view, the motor being taken away to show the gearing. Fig. 5 is a section on the line $x\ x$, Fig. 4. Figs. 6 and 7 are sectional views of the adjustable bearing. Figs. 8 and 9 show in detail the brakes. Fig. 10 is a detailed view of the brush-adjusting device. Fig. 11 is an enlarged section of the sand-box. Figs. 12 and 13 show in detail the cast-iron platform. Figs. 14 and 14ª show in side and end view the supporting-standards for the motor. Figs. 15 and 16 are views, looking at different angles, of one of the fenders. Figs. 17 and 18 are a front and side view, respectively, of one of the draw-heads. Figs. 19, 20, and 21 are views looking from the top, from the side, and from beneath one of the supports for the fenders. Fig. 22 shows a fender, one of the supporting-castings of part of the draw-head being shown in dotted lines. Fig. 23 is a central vertical longitudinal section of the car with all the parts in place.

In the drawings, A A represent the track-wheels of my improved mining-car, these being substantially of the ordinary character and secured to axles B B', which are brought as close together as is usual in cars of this sort.

In order to provide a large increase in the traction of the car within the space limited by reasons aforesaid, I provide a body, framework, or platform entirely of cast-iron, which can be made in one or more pieces of size so large that the car shall weigh many tons. As shown, this body or platform is made in two sections C C', separable from each other on vertical planes of division at $c$. Each section has inwardly-turned ears or flanges $c'$, which can be utilized to bolt together the two parts of the platform or body, as shown at $c^2$. Upon the inner sides of these there are formed integral with them inwardly-projecting flanges $C^2$ $C^2$ to provide a support for the engine or motor mechanism and also bearings for some of the shafting.

Between the side bars C C' of the frame and upon the flanges $C^2$ $C^2$ is mounted the stand or platform T, (see Figs. 12 and 13,) which provides a bearing for the shaft G. On each end of the platform T is bolted a box-like casting on standard U, upon which the motor mechanism is mounted, thus leaving a free space underneath for the rotation of the gear-wheels, the said platform T being centrally apertured for this purpose. The frame is provided at each end with a draw-head S to receive the coupling-links of the cars to be attached thereto. It is provided with a laterally-extending rear plate, by which it is bolted to the front face of the frame, and also with downwardly-projecting inclined flanges for the reception of the fenders or guards S' S'. The said guards or fenders S' are detachably supported by means of bolts upon the said flanges depending from the draw-heads S', and also upon supporting castings $S^3$, which are bolted to the under side of the frame-bars C C'.

The axles B B' have their bearings on the under sides of these parts of the cast-iron platform, which bearings are indicated as a whole by D and are bolted to the under side of the framework. (See Fig. 2.) To permit an adjustment in respect to the axles and the bearings I construct the parts at D with an exterior box portion having a chamber $d$ and apertures or recesses $d'$ through which the axles can pass. D' is a bearing-piece in this chamber D, and $D^2$ is a supporting and adjusting screw engaging with a threaded aperture in the bottom of the box and bearing against the piece D'. At $d^2$ $d^2$ there are guides for the part D'. Lubricant can be placed in the chamber around the bearing-piece, and in this way a self-oiling bearing is provided, and at the same time there are means for taking up wear as may be required, for it will be understood that as the frame work rests directly upon the axles the bearings will become in time worn. In order that this may be obviated, I use the adjustable bearing-piece D', which may be forced up by the screw, and in this way I prevent any looseness or rattling of the parts.

Power is transmitted to the axles as follows: F indicates, as a whole, an electric motor. The armature-shaft F' is transversely arranged and is provided with a pinion $f$. This engages with a gear-wheel $g$ in a plane between the sides of a motor and the plane of the track-wheels, the part C' of the cast-iron frame being preferably recessed at $C^3$ to receive it. This shaft G has also a pinion $g'$, which meshes with a wheel $h$ on shaft E. The latter shaft is mounted in bearings on the under side of the cast-iron body and preferably in the same horizontal plane with the axles B B'. It carries a spur-wheel $h'$, which meshes with wheels $i$ $i$ on the axles. These parts are all arranged centrally of the car longitudinally, so that the weight is uniformly distributed, and so that they are compact and require but little room. The car has brake-shoes J J, one pair upon each side, so that friction can be applied to all of the track-wheels simultaneously. The shoes J J of each pair are suspended from links $j'$ $j'$, which are pivoted to a bracket K, bolted to the body. J' is a sliding bar, one for each pair of shoes. It is placed between them and passes through an aperture in the bracket K, its lower end being united by links $j j$ to the shoes. When it is drawn up, the shoes are uniformly forced outward into contact with the peripheries of the wheels. L is a lever close to the place occupied by the operator. It is connected by a link $l$ with a rock-shaft $l'$, which latter is mounted across the machine in front of the motor and is connected to the sliding bar J' of each pair of shoes by means of a link $l^2$ and a bell-lever $l^3$. Each bell-lever is pivoted to a standard $k$ on a bracket K. A single pair of brake-shoes may be employed; but I prefer the construction shown, as the car can be much more readily controlled. The commutator is provided with two sets of brushes, adapted to be interchanged for reversing the current through the armature. The rocking supports of the brushes are provided with crank-arms or links $n$ $n$, whereby they are connected to a lever or bar N, extending out to the place occupied by the operator. The commutator is indicated by M, the brushes of one set by $m$ $m$, and those of the other set by $m'$ $m'$. The brush-carrier or yoke is indicated by $m^4$, it being adapted to rock around the armature-shaft. It is connected by an arm $m^5$ with an arm or lever O, also extending to within reach of the operator. $o$ is a set-clamp held in place on a pendent rod O', and by means of it the brush-adjusting mechanism and the bar or lever O can be securely fastened in place after adjustment.

By means of the devices just described it will be seen that the operator can readily and instantly adjust all of the brushes around the commutator, or can reverse or interchange the brushes so as to reverse the current. I have also provided means for readily applying sand to the track, when necessary, and for delivering it to both track-rails simultaneously.

P P represent one or more sand-boxes mounted on the forward end of the car. Preferably each has an inclined bottom, so as to throw the sand to a point of exit. At $p$ there is an outlet-tube with a leg $p^2$, turned toward the point under the wheel where it is desired to deliver the sand. The tube $p$ has a port $p'$, and in the upper end there is fitted a rocking valve Q, having a corresponding port and an upwardly-extending stem provided with a crank $q'$ at the top.

R is a draw rod or lever extending to within reach of the operator, and R' is a link connecting the cranks $q'$ of the valves. By moving the arm R the operator can deliver sand instantly to either track.

One of the objects of my invention is to provide a mine-car which will not only be compact with the smallest possible number of parts, but which shall have all the controlling-levers for the different mechanisms placed at one part of the car within easy reach of the operator. By examining the drawings it will be seen that the levers R, N, O, and L, for controlling, respectively, the sand-distributing devices, the brush-shifting and brush-adjusting mechanisms, and the brake are all in close proximity to each other at the rear end of the car and are so placed that the operator can readily lay his hand on any one of them.

What I claim is—

1. A mine car having a body or frame supported upon the track wheels and constructed of metal throughout in several parts separable on central vertical planes of division, and adapted to be bolted together, substantially as set forth.

2. A mine car having a body or frame work supported upon track wheels formed of several cast iron sections C C' bolted centrally together as at $c'$ $c^2$ and having bearings or means of supporting the axles and car shafting, substantially as set forth.

3. A mine car having a frame or body formed of separable sections of cast iron bolted together at points near their ends, in combination with the track wheels and their axles on the under side of said cast iron frame, a shaft for transmitting power to said axle, mounted in bearings on said frame, said shaft and said axles being in substantially the same plane, and a motor mounted on said frame above said shaft and transmitting power thereto, substantially as set forth.

4. A mine car having a frame work or body separable in central vertical plane, in combination with the motor mounted on said frame, the track wheels, and the axles therefor, mounted in bearings under the frame, and gearing for transmitting power from said motor to said axles, substantially as set forth.

5. In a mine car the combination of the track wheels, the axles, the platform, the electric motor, the gearing connecting said motor with the axle, the commutator brushes, the brush reversing lever, the brush adjusting lever, independent of said brush reversing lever said levers being in proximity to each other, substantially as set forth.

6. In a mine car the combination of the platform the track wheels, the axles, the electric motor having an armature shaft arranged transversely of the car, said motor being arranged substantially as set forth to provide a free space for the operator, the two sets of reversible or interchangeable brushes the rocking devices for adjusting the brushes around the commutator and the levers N and O situated transversely to the armature shafts and projecting horizontally toward the operator's space, substantially as set forth.

7. In, a mine car, the centrally open rectangular main frame formed in two parts of cast metal, each part being cast with an inwardly extending flange or plate $C^2$ and comprising a side bar and the inwardly turned part of a cross or end bar at each end of the side bar, means for connecting rigidly the inwardly turned parts of the end bars, the axles supported on the under sides of the two side sections of the main frame, each axle having a gear wheel between the sides of the main frame, and a power shaft also supported on the under side of the main frame, and geared to both of said wheels, substantially as set forth.

8. In a mine car, the combination of the centrally open main frame, the armature shaft $F^2$ above the main frame, a countershaft G, the spur gearing connecting the shafts $F^2$ and G, the shaft E below the shaft G, the spur gearing connecting said shafts G and E, and the gearing connecting the said shaft E with the axles, the said gearing being situated in the central open space of the said main frame, substantially as set forth.

9. A mine car having a centrally open rectangular main supporting frame formed of two sections of cast metal separable on the central longitudinal plane, means for rigidly fastening together, the said two sections, in combination with the cast metal fenders S' S' detachably secured to the said rectangular frame there being one of said fenders at each end of the frame, substantially as set forth.

10. In a mine car, the combination with the main frame, the axles beneath said frame, the shaft E, the gearing connecting the said shaft with the said axles, the shaft G, the gearing connecting the shaft E with the shaft G, the last two said gearings being arranged between the sides of the main frame, the transverse engine or armature shaft, the pinion thereon and the gear wheel on shaft G meshing therewith, said pinion or gearing being outside of the vertical planes of the space between the sides of the frame, substantially as set forth.

11. In a mine car, the combination with the main frame or truck, of the driving wheels having bearings therein, the frame secured to the truck, the motor mounted on said frame, an intermediate shaft, intermediate reducing gearings between the motor and the shaft, and connections between the shaft and the driving wheels, substantially as set forth.

12. In a mine car, the combination with the truck or frame, the driving wheels having bearings therein, the frame rigidly mounted on the said truck, the motor mounted on said frame, an intermediate or counter shaft, reducing gears between the motor and said shaft, and spur gearing connecting said shaft with said driving wheels, substantially as set forth.

13. In a mine car the combination with the main frame having the side bars C, C', driving wheels, and the axles therefor mounted on said side bars of the plate mounted on said side bars and having motor supporting standards, a shaft journaled in bearings on said plate, a motor mounted on said standards, gearing connecting said motor and said shaft, and power connections between said shaft and said axles, substantially as set forth.

In testimony whereof I affix my signature in presence of two witnesses.

HENRY B. DIERDORFF.

Witnesses:
FRED H. CROUGHTON,
JAMES COULTER.